Dec. 11, 1945. A. L. AYERS 2,390,912
TANDEM AXLE VEHICLE
Filed May 22, 1942 4 Sheets-Sheet 1
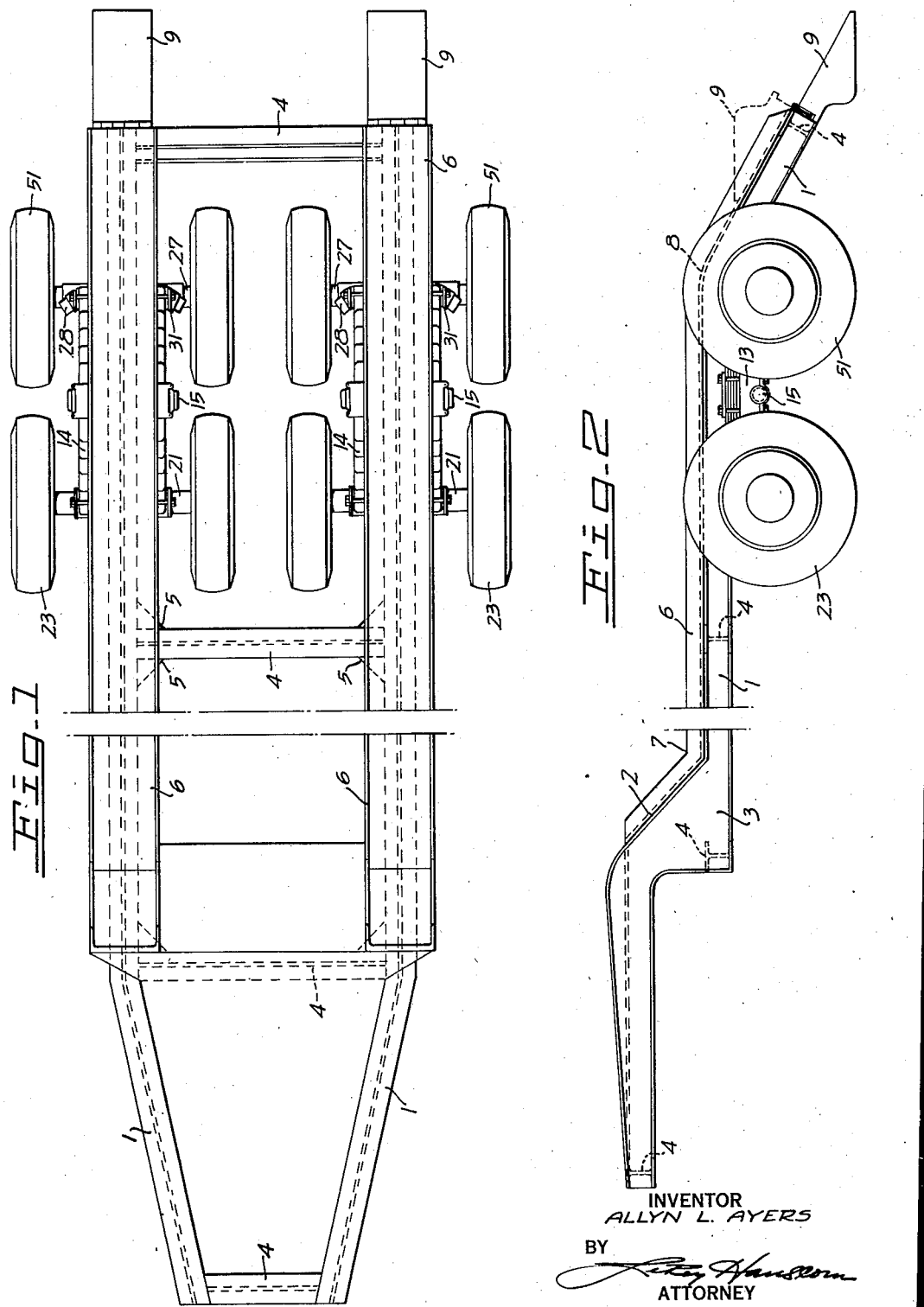
INVENTOR
ALLYN L. AYERS
BY
ATTORNEY

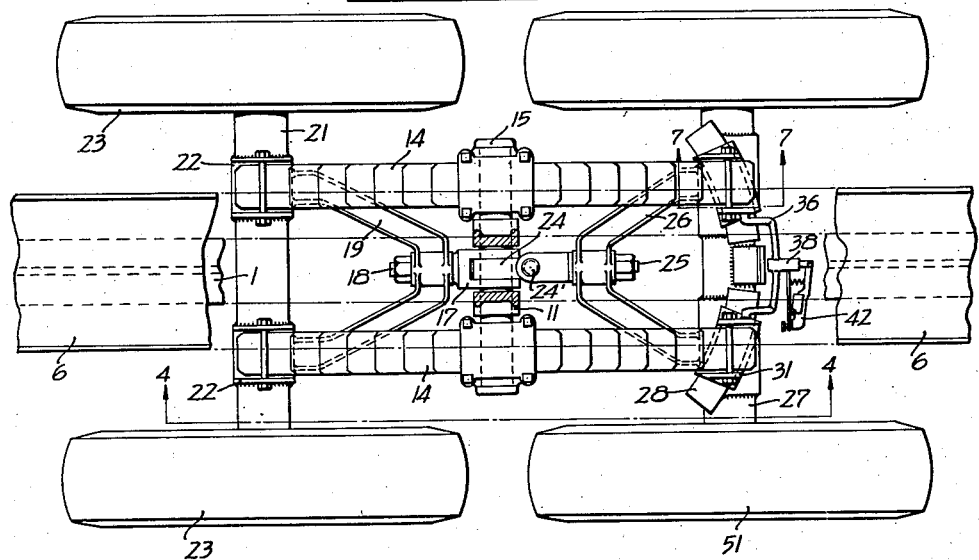
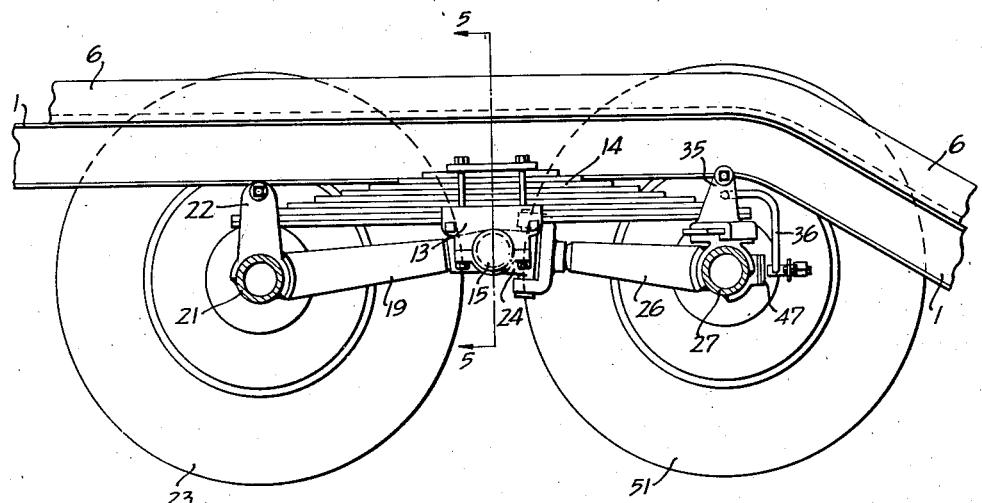

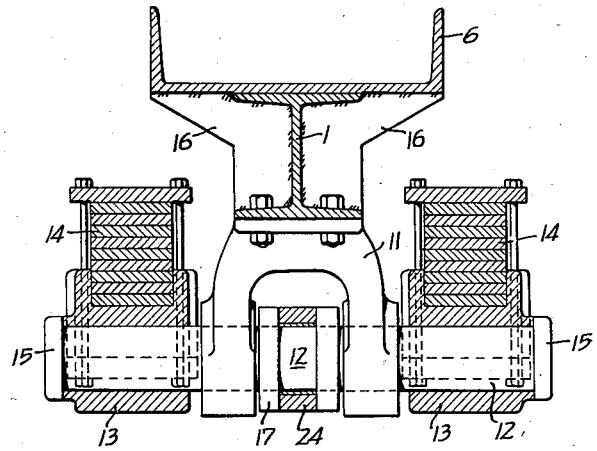
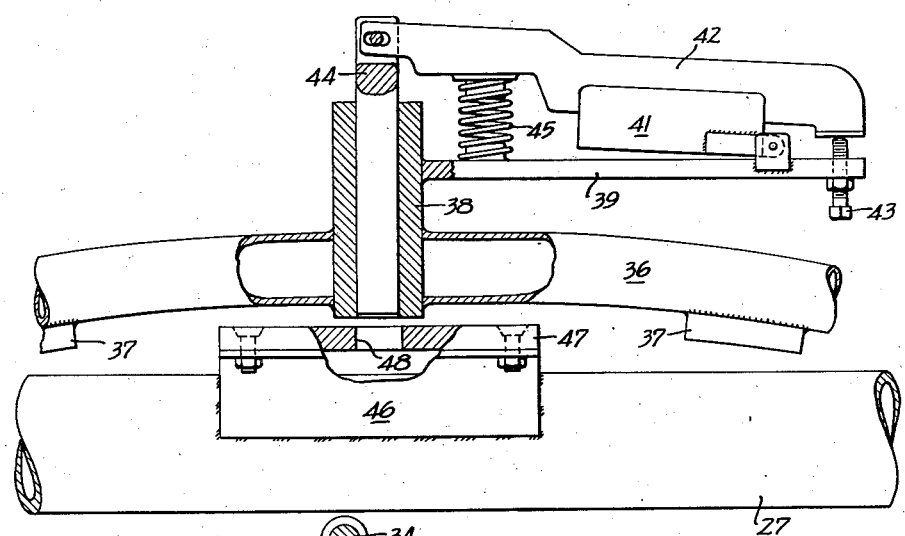
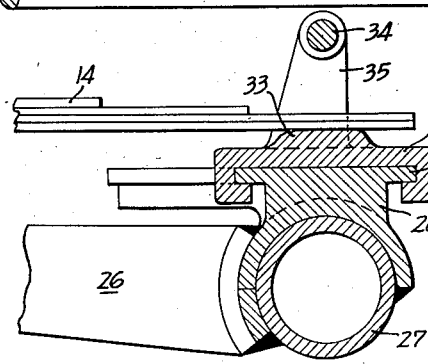

Dec. 11, 1945. A. L. AYERS 2,390,912
TANDEM AXLE VEHICLE
Filed May 22, 1942 4 Sheets-Sheet 4

INVENTOR
ALLYN L. AYERS
BY
ATTORNEY

Patented Dec. 11, 1945

2,390,912

UNITED STATES PATENT OFFICE 2,390,912

TANDEM AXLE VEHICLE

Allyn L. Ayers, Oakland, Calif.

Application May 22, 1942, Serial No. 444,018

7 Claims. (Cl. 280—81)

This invention relates to vehicles supported in part by tandem axles, and in which the rear axle is articulated to the vehicle so as to be free to swing relative thereto.

Several modifications of vehicles of this general type are disclosed in my co-pending applications Serial Nos. 387,117 and 439,826 filed respectively on Apr. 7, 1941, and Apr. 21, 1942, this application being a continuation in part of said latter application. These applications have become Patents No. 2,284,245, May 26, 1942, and No. 2,361,166, October 24, 1944, respectively.

In general, the object of this invention is the provision of a vehicle supported in part by two laterally spaced sets of tandem axles, in which the rear axle of each set of axles is articulated to the vehicle for limited swinging movement with respect to the vehicle frame.

Another object of this invention is the provision of a low bed vehicle supported in part by two sets of laterally spaced tandem axles designed to carry a tank or other vehicle and in which the tires or tread of such tank or other vehicle may be supported by the wheels carried by each set of said tandem axles.

The invention possesses other advantageous features, some of which with the foregoing will be set forth at length in the following description where those forms of the invention which have been selected for illustration in the drawings accompanying and forming a part of the present specification are outlined in full. In said drawings, two forms of the invention are shown, but it is to be understood that it is not limited to such forms, since the invention as set forth in the claims may be embodied in a plurality of forms.

Referring to the drawings:

Figure 1 is a top plan view of a semi-trailer embodying the objects of my invention.

Figure 2 is a side elevation of the semi-trailer shown in Figure 1.

Figure 3 is an enlarged detail of one of the bogies supporting the semi-trailer shown in Figures 1 and 2, in which the frame of the vehicle has been broken away to better illustrate the construction of the bogie.

Figure 4 is a vertical section taken on the line 4—4 of Figure 3.

Figure 5 is a vertical section taken on the line 5—5 of Figure 4.

Figure 6 is an enlarged detail of the locking mechanism for locking the rear trailing axle of each set of tandem axles in parallelism with its associated forward axle.

Figure 7 is an enlarged detail taken on the line 7—7 of Figure 3, showing the pads for supporting the bogie springs on the trailing axle.

Figure 8:
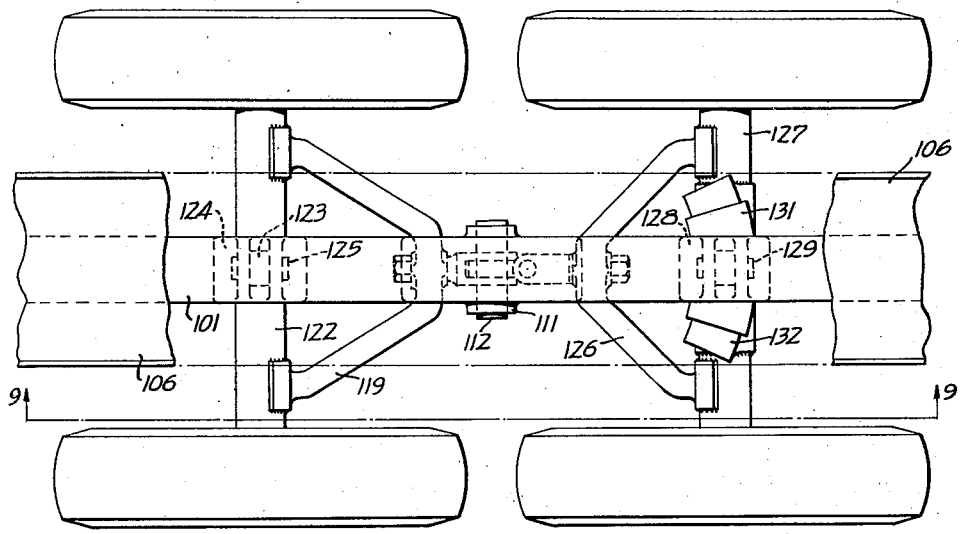
Figure 8 is an enlarged detail of a modified bogie for supporting a vehicle without the use of springs.

The chassis of the semi-trailer shown in Figures 1 and 2 comprises a pair of longitudinally extending, laterally spaced I-beams 1 (see Figure 5) converging at their forward ends as shown in Figure 1 and downwardly inclined at their rear ends as shown in Figure 2. To bring the level of the forward end of the I-beams to the level of a standard truck, they have been offset at the point 2, and to stiffen them beneath this point, their width has been materially increased as at 3. Extending between and welded to the I-beams 1 are a number of longitudinally spaced cross members 4, also in the form of I-beams. Welded in the corners formed by the I-beams 1 and 4 are stiffening gussets 5. Disposed over each of the I-beams 1 and welded thereto is a channel 6 offset at the points 7 and 8 and forming a track or run-way for the tread or tires of a tank or vehicle. Hinged to the downwardly inclined rear ends of the channels 6 are aprons 9.

Bolted to each of the I-beams 1 intermediate its ends is a forked bearing 11 to which is journaled a stub shaft 12. Mounted on each end of the stub shaft 12 is a spring saddle 13, to which is bolted a leaf spring 14. The spring saddles 13 are retained in place on the shaft 12 by caps 15 threaded to the ends of the shaft. Welded to the I-beams 1 and the channels 6 are gussets 16 for the purpose of stiffening these members at a point substantially above the forked member 11.

Journaled on the shaft 12 between the arms of the forked bearing 11 by means of a bifurcated sleeve 17 is a pin 18, and swiveled to this pin is a wish-bone or yoke 19, the outer ends of which are welded to a fixed axle 21. Welded to each end of the fixed axle 21 is a spring saddle 22 on which the ends of the leaf springs 14 slidably recline. Mounted on the axle 21 in the usual manner are tired wheels 23.

Journaled on the shaft 12 within the bifurcated sleeve 17 is a sleeve 24, and swiveled to this sleeve is a pin 25. Journaled on the pin 25 is a wish-bone or yoke 26, the outer ends of which are welded to a trailing axle 27.

Welded to each end of the trailing axle 27 is an arcuate axle pad 28 formed with overhanging flanges 29. Slidably supported on each of the axle pads 28 is an arcuate spring pad 31 formed with channels 32 for the reception of the flanges 29. The upper surfaces of the spring pads 31 are formed with seats 33 in which the rear ends of the leaf springs 14 slidably recline. Vertical movement of the ends of the spring leaf 14 with respect to the pads 31 is limited by pins 34 secured between arms 35 extending forwardly from the pads 31.

Welded to the arcuate spring pads 31 and forming a continuation thereof is a downwardly offset tie rod 36 provided on its horizontal reach with stop members 37. A sleeve 38 provided with a laterally extending armature arm 39 is welded to the tie rod 36 intermediate the stop members 37. Pivoted to the outer end of the arm 39 is an electromagnet 41 to which is secured an arm 42. Movement of the outer end of the arm 42 is limited by the set screw 43 carried by the armature arm 39. Pivoted to the inner end of the arm 42 is a pin 44 slidably disposed within the sleeve 38. Disposed between the inner ends of the arms 39 and 42 is a compression spring 45 serving to hold the pin 44 outwardly in its disengaged position. Welded to the trailing axle 27 intermediate its ends is a saddle 46, and secured to this sadle is a plate 47 provided with a central opening 48 adapted to receive the inner end of the pin 44 when the sleeve 38 is in registration with the opening 48 and when the magnet 41 has been energized and drawn downwardly to the armature plate 39. The sleeve 38 and the opening 48 in the plate 47 are so located that when the pin 44 is engaged in the opening 48, the trailing axle 27 will be locked in parallelism with the fixed axle 21.

The forward axle 21 of each of the bogies above described is fixed only in the sense that it is always substantially perpendicular to the horizontal center line of its bogie, although the leaf springs 14, the pin 18, and the yoke 19 permit this axle to move up and down and to tilt in a vertical plane. The trailing axle 27 is permitted to move vertically about the axis of the shaft 12, to tilt about the axis of the pin 25, and to swing in a substantially horizontal plane about the axis 24' of the swivel joint between the sleeve 24 and the pin 25. The axle 27 may therefore be considered as being articulated to the trailer frame about the axis 24', which is substantially midway between the two axles 21 and 27, and mounted to the frame through the load transfer bearing formed by the arcuate pads 28 and 31. The yokes 19 and 26 serve the further function of equalizing the braking torques to which the axles 21 and 27 may be subjected, for it is contemplated, although not shown in the drawings, that the wheels 23 carried by the axle 21 as well as the wheels 51 carried by the axle 27, will be provided with suitable brakes.

By mounting the bogies to the laterally spaced I-beams 1 so that the wheels 23 and 51 straddle the I-beams 1 as well as the channels 6, the bed of the vehicle formed by the two parallel faces of the channel 6 may be kept relatively low, a feature which is highly desirable when it is kept in mind that the semi-trailer above described has been particularly designed for the transportation of tanks or other vehicles. By mounting the bed of the trailer as low as possible, the tank may be either driven over the rear inclined end of the runways formed by the channels 6 and the aprons 9 to a position wherein the forward ends of the tread of the tank recline against the forward inclined ends of the channels 6. Another advantage of having the bogies straddle the I-beams 1 is that sufficient clearance is left between the adjacent inner rear wheels of the bogies to permit the two trailing axles 27 to swing about their pivotal points.

Figure 9:
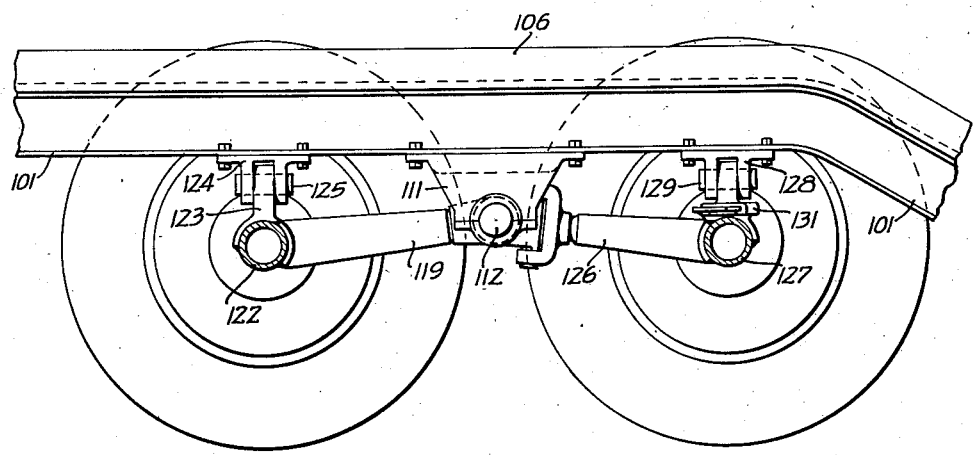
Figure 9 is a vertical section taken on the line 9—9 of Figure 8.

Figures 8 and 9 illustrate a modification of the invention wherein no springs whatsoever are interposed between the bogies and the trailer frame. In this modification, the construction of the frame or chassis of the vehicle is identical with the construction illustrated in Figures 1 and 2 and includes a pair of longitudinally extending, laterally spaced I-beams 101, to the top faces of which are welded channels 106. As in the structure shown in Figure 1, the I-beams 101 are connected together by cross members, not shown in Figures 8 and 9. Bolted to and depending from each of the I-beams is a forked bearing 111 in which is journaled a stub shaft 112. Coupled to this shaft is a wish-bone yoke 119, the outer ends of which are welded to the forward fixed axle 122. The manner in which the yoke 119 is coupled to the shaft 112 is identical with the manner in which the yoke 19 as shown in Figure 3 is coupled to the stub shaft 12. Welded to the axle 122 is a lug 123 swiveled to a bracket 124 by means of a pin 125. It will therefore be seen that the connection between the yoke 119 and the shaft 112, and the connection between the axle 122 and the I-beam 101, permit the fixed axle 122 to tilt about the axis of the pin 125.

Coupled to the stub shaft 112 is a wish-bone or yoke 126, the outer ends of which are welded to a trailing axle 127. Here again, the construction of the coupling between the shaft 112 and the yoke 126 is identical with the construction of the coupling between the two corresponding members shown in Figures 3 and 5.

Bolted to each I-beam 101 above the trailing axle 127 is a bracket 128, and swiveled to this bracket by a pin 129 is a shoe or pad 131. Provided on the lower face of the arcuate pad 131 are lateral channels for slidably receiving the outwardly extending flanges of an arcuate axle pad 132 welded to the axle 127. It should be particularly noted that in this modification only one set of complementary pads 131 and 132 is used, rather than two spaced sets of pads as shown in Figure 3. The coacting shoes 131 and 132 and the coupling between the shaft 112 and the yoke 126 permit the trailing axle 127 to swing about a point intermediate the axles 122 and 127 and also to tilt about the axis of the pin 129. The trailing axle 127 may be considered as being articulated to the I-beam 101, and the coacting pads 131 and 132 may be considered as a load transfer bearing by means of which the axle 127 is mounted to the I-beam. Although not all of the movements permitted by the couplings between the shaft 112 and the yokes 119 and 126 can be utilized (since no springs are interposed between the bogies shown in this modification and the frame), this type of coupling is resorted to for the reason that it is interchangeable with the coupling required in the modification shown in Figures 3 and 4.

Although not shown, means may be provided for locking the trailing axle 127 parallel with the fixed axle 122. This may readily be done by mounting a magnetically operated pin on the arcuate pad 131 so as to pass through registering holes in this pad and in its coacting pad 132. The locking action thus obtained would be similar to that shown in Figure 6, although the locking pin, as above stated, would be carried by the pad 131 rather than by the tie rod 36 shown in Figure 6.

From the above description it will be appreciated that I have provided a low bed vehicle having a frame of very simple construction and which can be very conveniently used for the transportation of tanks or other vehicles. Furthermore, by the use of two parallel laterally spaced bogies, the load carried by the vehicle is distributed over an extended area. By articulating the rear axle of each of the bogies, skidding of the rear tires is prevented, thereby avoiding undue tire wear and decreasing the power required to propel the vehicle around a curve, and making it possible to turn the vehicle through a shorter arc.

I claim.

1. A vehicle comprising: a pair of parallel, laterally spaced bogies, each bogie including a trailing axle articulated thereto for swinging movement in a substantially horizontal plane and a forward axle; and a longitudinally extending beam carried by each of said bogies with the opposed wheels of each bogie straddling the beam which it supports, the forward axles of the two bogies being normally coaxial, and the trailing axles of the two bogies being normally coaxial.

2. A vehicle comprising: a pair of parallel, laterally spaced bogies, each including a forward axle and a trailing rear axle articulated thereto for swinging movement about an axis substantially midway the forward and trailing axles, the forward axles being coaxial with each other and the trailing axles being normally coaxial with each other; a beam supported by each bogie longitudinally thereof with the opposed wheels of the bogie straddling the beam; and cross members secured to and between said beams.

3. A vehicle comprising: a pair of parallel, laterally spaced bogies, each including a forward axle and a trailing axle articulated thereto for swinging movement about an axis intermediate the forward and trailing axles, the forward axles being co-axial with each other and the trailing axles being normally coaxial with each other; a beam supported by each bogie longitudinally thereof with the opposed wheels of the bogie straddling the beam; cross members secured to and between said beams; and means for locking each of said trailing axles parallel with said fixed axles.

4. In a vehicle: a pair of parallel, laterally spaced beams extending longitudinally thereof; a forward axle pivoted to each of said beams for tilting movement in a substantially transverse vertical plane; and a trailing axle articulated to each of said beams to the rear of said forward axles for tilting movement in a substantially transverse vertical plane and for swinging movement in a horizontal plane about a vertical axis.

5. In a vehicle: a pair of parallel, laterally spaced beams extending longitudinally thereof; a pair of longitudinally opposed front and rear wish-bone yokes swiveled to the lower side of each of said beams in transverse alignment with each other; front and rear axle housings secured respectively to the free ends of each of said front and rear yokes; a pivotal connection between each of said front axle housings and its associated beam for permitting said axle housing to tilt about a substantially horizontal longitudinally extending axis; and a sliding bearing between each of said rear axle housings and its associated beam.

6. In a vehicle: a pair of parallel, laterally spaced beams extending longitudinally thereof; a transverse shaft carried by each of said beams in axial alignment with each other; longitudinally disposed leaf springs mounted on each end of each of said shafts; a pair of longitudinally opposed front and rear wish-bone yokes swiveled to each of said shafts intermediate its associated leaf springs; a front axle housing secured to the free ends of each of said front wish-bones in sliding engagement with the forward ends of its associated leaf springs; a rear axle housing secured to the free ends of each of said rear yokes; and a sliding bearing between each of said rear axle housings and the rear ends of its associated leaf springs.

7. In a vehicle: a pair of parallel, laterally spaced beams extending longitudinally thereof; tandem axles associated with each of said beams, the forward axle of each of said tandem axles being arranged for tilting movement only in a transverse vertical plane and the rear axle of each of said tandem axles being arranged for swinging movement in a horizontal plane and for tilting movement in a transverse vertical plane.

ALLYN L. AYERS.